United States Patent [19]

Shirn et al.

[11] Patent Number: 4,531,177
[45] Date of Patent: Jul. 23, 1985

[54] ELECTROLYTIC CAPACITOR CONTAINING A HYDROCHLORIC ACID ELECTROLYTE

[75] Inventors: George A. Shirn, Williamstown; William J. Pfister, Cheshire, both of Mass.

[73] Assignee: Sprague Electric Company, North Adams, Mass.

[21] Appl. No.: 569,534

[22] Filed: Jan. 9, 1984

[51] Int. Cl.³ .............................................. H01G 9/02
[52] U.S. Cl. .................................... 361/433; 252/62.2
[58] Field of Search ......................... 361/433; 29/570; 252/62.2

[56] References Cited

U.S. PATENT DOCUMENTS

| 2,834,926 | 5/1958 | Booe | 252/62.2 X |
| 3,243,316 | 3/1966 | O'Nan et al. | 117/226 |
| 3,243,668 | 3/1966 | Diggens | 361/433 |
| 3,335,335 | 8/1967 | Perkins | 317/230 |
| 3,356,912 | 12/1967 | Rairden et al. | 317/235 |
| 3,515,951 | 6/1970 | Krasienko et al. | 317/230 |
| 4,115,629 | 9/1978 | Dey et al. | 361/433 X |
| 4,159,509 | 6/1979 | Walters | 361/433 |

Primary Examiner—L. T. Hix
Assistant Examiner—Douglas S. Lee

[57] ABSTRACT

An electrolytic capacitor containing an anodized porous tantalum pellet utilizes as electrolyte an azeotrope of hydrochloric acid and water, preferably containing about 20 wt % hydrochloric acid.

6 Claims, 2 Drawing Figures

ELECTROLYTIC CAPACITOR CONTAINING A HYDROCHLORIC ACID ELECTROLYTE

BACKGROUND OF THE INVENTION

This invention relates to an electrolytic capacitor utilizing an anodized porous tantalum pellet as anode and an azeotrope of hydrochloric acid and water as electrolyte. The azeotrope electrolyte preferably contains about 20 wt% hydrochloric acid.

Strong acid electrolytes, notably sulfuric acid, have been used in tantalum pellet capacitors as have lithium chloride electrolytes. However, improvements in capacitor operation, particularly at −55° C., are desirable and, in particular, improvements in equivalent series resistance, ESR, and impedance, Z.

Hydrochloric acid has been mentioned as a strong acid electrolyte. However, it was believed that it could not be used with silver cases as there was already a problem with silver "creep", i.e., dissolution of silver followed by replating and dendritic silver growth which bridged the space between anode and cathode, shorting out the capacitor. Silver salts are frequently dissolved in current electrolytes to saturate the electrolyte and prevent dendritic silver growth. It was also believed from the listed freezing point of aqueous hydrochloric acid that it would be an unsuitable electrolyte for −55° C. operation.

SUMMARY OF THE INVENTION

It is a feature of this invention to provide a porous tantalum pellet electrolytic capacitor capable of −55° C. to 200° C. operation containing hydrochloric acid electrolyte. It is also a feature of the invention to use such electrolyte in the tantalum capacitor utilizing a silver casing.

The freezing point of a 12% hydrochloric acid solution is listed as −20° C. and no values are given for higher concentrations (Handbook of Chemistry and Physics, 63rd ed., p. D-240, 1982). However, it has been found that even at −55° C., the solution is not frozen solidly but is still slushy and the resistivity-temperature curve remains smooth and acceptable. The 20% and 37% hydrochloric acid solutions behaved similarly.

A 12 wt% hyrochloric acid solution has ESR and impedance properties at −55° C. equivalent to the conventional commercial sulfuric acid (38 wt%) electrolytes. A 20% hydrochloric acid solution provides lower ESR and impedance values at −55° C. while a 37 wt% hydrochloric acid solution (concentrated hydrochloric acid) is equivalent to the 20% solution. Thus, increasing the hydrochloric acid concentration above 12 wt % results in improving ESR and impedance at −55° C. Since the 20% and 37% solutions give the same properties, the 20 wt% is preferred from an economic standpoint and also because as it is the azeotrope it will not change its composition on standing and can be made up in volume.

When sulfuric acid is used as an electrolyte in silver cans, silver creep is a problem. When the 20% hydrochloric acid was used in silver cans, no metallic silver was plated on the anode even after 2000 hrs. Leakage currents were also less with the hydrochloric acid electrolyte than with the sulfuric acid electrolyte after 2000 hrs of life test with AC ripple current.

In the examples below, silver containers were used exclusively as the silver system was the most critical. However, the container may be tantalum or copper.

The capacitor may utilize a hermetic glass-to-metal seal for −55° C. to 200° C. operation or an elastomeric seal for −55° C. to 85° C. operation.

DESCRIPTION OF THE PREFERRED EMBODIMENTS

Figure 1:
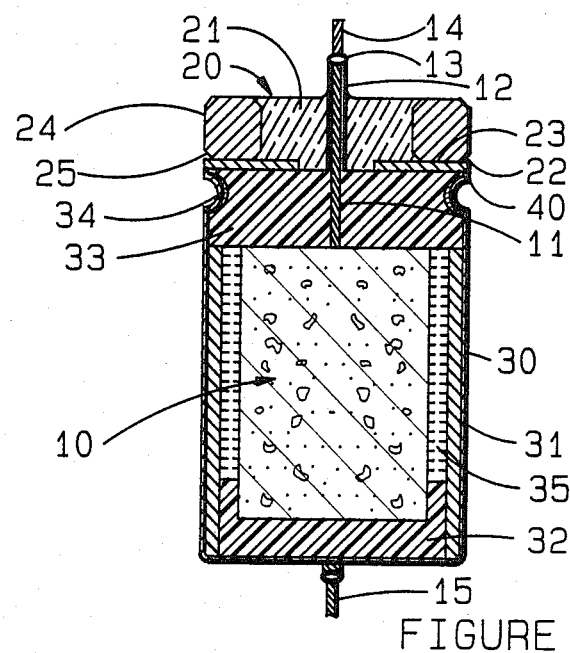
FIG. 1 is a cross-section of a tantalum porous pellet capacitor having a hermetic seal and containing an electrolyte of the present invention.

FIG. 1 shows a capacitor with a porous tantalumanode 10 having a riser 11 which extends into tube 12 of glass-to-metal seal 20. Riser 11 is sealed to tube 12 by weld 13 which also seals tube 12 externally of seal 20. External lead 14 is attached to weld 13. Seal 20 has a metal washer 22 to which compression ring 24 is attached by braze or weld 23. A mass of glass 21 fills the cavity defined by ring 24, washer 22, and tube 12 and is bonded to them. Ring 24 has chamfers 25 on its inner and outer edges.

Container 30, preferably tantalum, serves as a cathode and has an internal sleeve 31, preferably of porous tantalum, attached thereto to increase the surface area thereof. In the bottom of container 30, there is a spacer 32 into which anode 10 fits. The space between anode 10 and cathode sleeve 31 is filled with the hydrochloric acid-water azeotrope as electrolyte. External lead 15 is attached to the external bottom of container 30.

Gasket 33 is compressed against the top of anode 10 to hold it firmly against spacer 32. Ring 34 surrounds gasket 33 and container 30 is necked-in at this point. Seal 20 is attached to the open end of container 30 by weld 40 around the periphery of the bottom of washer 22 and the top edge of container 30.

Figure 2:
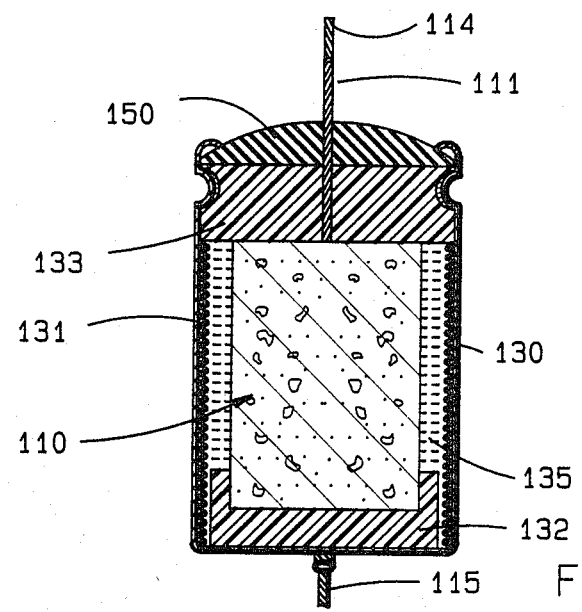
FIG. 2 is a cross-section of a similar capacitor which utilizes an elastomeric seal.

In FIG. 2, anode 110 having a riser 111 is located in container 130, preferably tantalum, silver, or copper, bearing on its inner surface a layer of finely-divided material 131 to increase the surface area of container 130 which serves as cathode. The finely-divided material 131 may be platinum black or finely-divided colloidal carbon.

Spacer 132 located in the bottom of container 130 receives anode 110 which is firmly pressed against it by gasket 133 which is compressed against the top portion of anode 110. Spacer 132 fits snugly against the side of container 130 and liner 131 but a space was left for purposes of clarity. Riser 111 passes through gasket 133 and outer elastomeric seal 150. Container 130 is spun over seal 150 in a known manner. External lead 114 is attached, preferably by welding, to riser 111 external of the seal. Similarly, external lead 115 is attached to the bottom outer surface of container 130.

Electrolyte 135 fills the space between anode 110 and container 130 and is the hydrochloric acid-water azeotrope.

As noted above, the experimental work concentrated on electrolyte behavior in silver cases as this was the critical case material. The low- and high-temperature behavior of the hydrochloric acid azeotrope was also tested in hermetically sealed tantalum units. The low-temperature (−55° C.) properties, particularly ESR, were better than the sulfuric acid electrolyte currently used, and the high-temperature (200° C.) properties were at least as good. Since the electrolyte has proven feasible with silver cases, it will also perform well in tantalum and copper cases.

EXAMPLE 1

Impedance, Z, and equivalent series resistance, ESR, measured in ohms were determined at $-55°$ C. over the frequency range 100 Hz to 10 MHz in 180 $\mu$F-75 V silver cased tantalum pellet capacitors with 2.2 V bias. Electrolyte A is a standard gelled 38 wt% sulfuric acid electrolyte, and electrolyte B is the 20% hydrochloric acid-water azeotrope.

TABLE 1

| Frequency | Electrolyte A | | Electrolyte B | |
|---|---|---|---|---|
| | Z | ESR | Z | ESR |
| 100 Hz | 12 | 7.5 | 10 | 4.75 |
| 1 kHz | 5.5 | 4.75 | 4.5 | 3.0 |
| 10 kHz | 3.0 | 2.9 | 1.6 | 1.5 |
| 100 kHz | 2.0 | 2.0 | 1.0 | 1.0 |
| 1 MHz | 1.6 | 1.6 | 0.8 | 0.8 |
| 10 MHz | 1.5 | 1.5 | 0.8 | 0.7 |

At all frequencies, the hydrochloric acid azeotrope gave lower impedance and ESR at $-55°$ C. At the higher frequencies, there was a 2:1 advantage for the hydrochloric acid over the sulfuric acid electrolyte. However, this advantage did not hold at 25° C., 85° C., or 125° C. While there is a difference in impedance and ESR at lower frequencies (up to 10-30 kHz), each were the same for both electrolytes at higher frequencies.

EXAMPLE 2

The scintillation voltage was measured for units containing sulfuric acid and those containing the hydrochloric acid azeotrope. The tantalum pellet anodes had been anodized to 270 V, and the cases were platinized silver. The applied voltage was raised slowly through a 10 k$\Omega$ resistor, and the voltage at which flickering or high current starts was recorded as scintillation voltage.

TABLE 2

| | $H_2SO_4$ | HCl |
|---|---|---|
| Scintillation Voltage | 161 | 210 |
| | 180 | 190 |
| | 156 | 198 |
| | 183 | 190 |

Thus, the capacitors containing the hydrochloric acid azeotrope electrolyte can be used at higher voltages than those containing sulfuric acid.

What is claimed is:

1. An electrolytic capacitor comprising an anodized tantalum porous pellet anode, said anode being housed in a metal container serving as cathode open at one end, a seal for said open end, and an electrolyte contacting said anode and said cathode, said electrolyte consisting essentially of an azeotrope solution of hydrochloric acid and water containing about 20 wt% hydrochloric acid, and said container is selected from the group consisting of tantalum, silver and copper.

2. A capacitor according to claim 1 wherein said container has a liner of finely-divided material adhered thereto.

3. A capacitor according to claim 2 wherein said container is silver and said material is platinum.

4. A capacitor according to claim 2 wherein said container is tantalum and said material is tantalum.

5. A capacitor according to claim 1 wherein said seal is a hermetic glass-to-metal seal.

6. A capacitor according to claim 1 wherein said seal is a resilient seal.

* * * * *